United States Patent [19]

Barnett, III

[11] 4,183,144
[45] Jan. 15, 1980

[54] STRIP SHINGLE ALIGNMENT FIXTURES

[76] Inventor: Larkin H. Barnett, III, 4200 Flowerfield Rd., Norfolk, Va. 23518

[21] Appl. No.: 840,431

[22] Filed: Oct. 7, 1977

Related U.S. Application Data

[63] Continuation-in-part of Ser. No. 709,683, Jul. 29, 1976, Pat. No. 4,056,889, which is a continuation-in-part of Ser. No. 610,727, Sep. 5, 1975, abandoned.

[51] Int. Cl.² .................................................. G01B 3/30
[52] U.S. Cl. ...................................................... 33/188
[58] Field of Search .................................. 33/188, 187

[56] References Cited

U.S. PATENT DOCUMENTS

| | | | |
|---|---|---|---|
| 54,584 | 5/1866 | Newbank | 33/188 |
| 780,697 | 1/1905 | Adams | 33/188 |
| 786,710 | 4/1905 | Anderson | 33/188 |
| 844,612 | 2/1907 | Morris | 33/188 |
| 1,210,469 | 2/1917 | Harshberger | 33/188 |
| 1,396,274 | 11/1921 | Neumeister | 33/188 |
| 1,405,760 | 2/1922 | Collin et al. | 33/188 |
| 2,470,183 | 5/1949 | Peters | 33/188 |
| 2,891,318 | 6/1959 | Harrison et al. | 33/188 |
| 4,056,889 | 11/1977 | Barnett | 33/188 |

Primary Examiner—William D. Martin, Jr.
Attorney, Agent, or Firm—Pollock, Vande Sande and Priddy

[57] ABSTRACT

Fixtures for aligning strip shingles for roofing and siding are disclosed. An elongated alignment guide is provided for supporting the lower edges of a plurality of shingles to be laid on a roof or attached to a building wall. In one embodiment, the alignment guide comprises a plurality of sections, some equal in length to two standard strip shingles; and some, to a single standard strip shingle, thereby permitting the assembly of alignment guides of various lengths from one to a desired number of standard shingle lengths. A clamping device attached to the alignment guide includes a pair of essentially flat, opposed jaws which are connected by spring-biased levers, for compressing the jaws together to grip a shingle in a previously laid row of shingles. A horizontal stop positions the device so that successive rows of strip shingles are staggered relative to each other.

5 Claims, 13 Drawing Figures

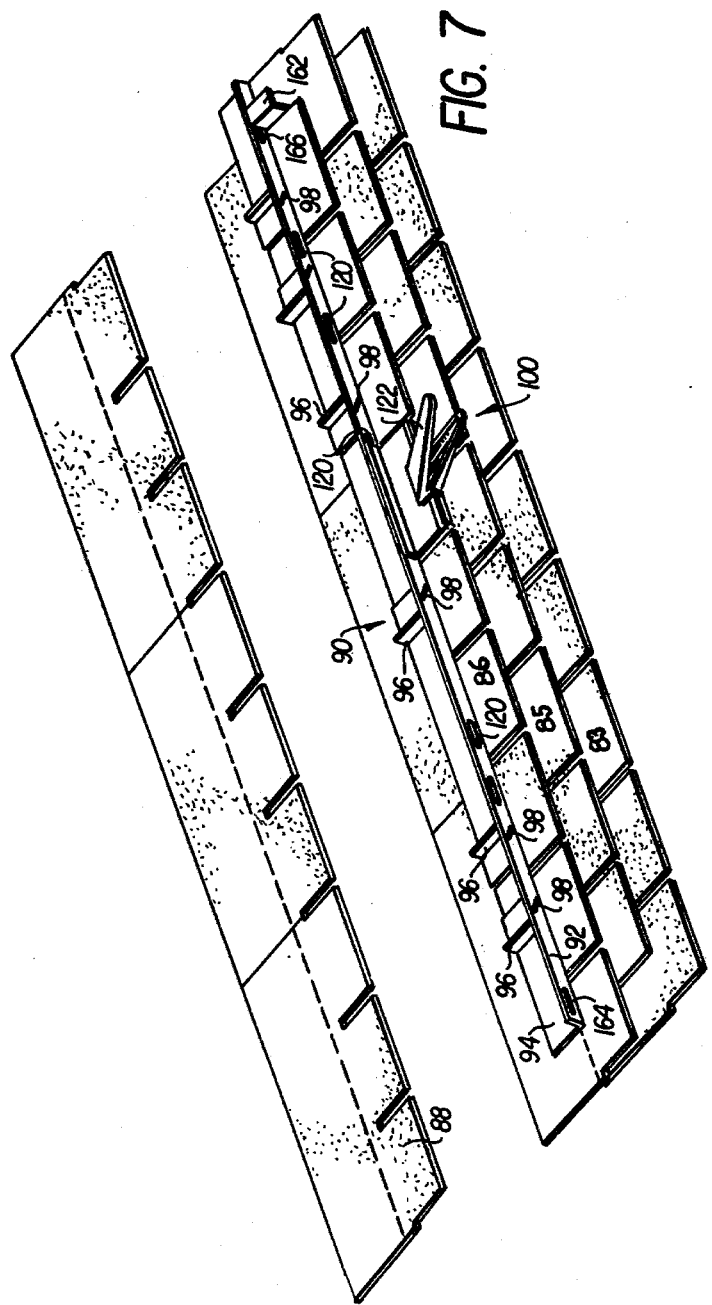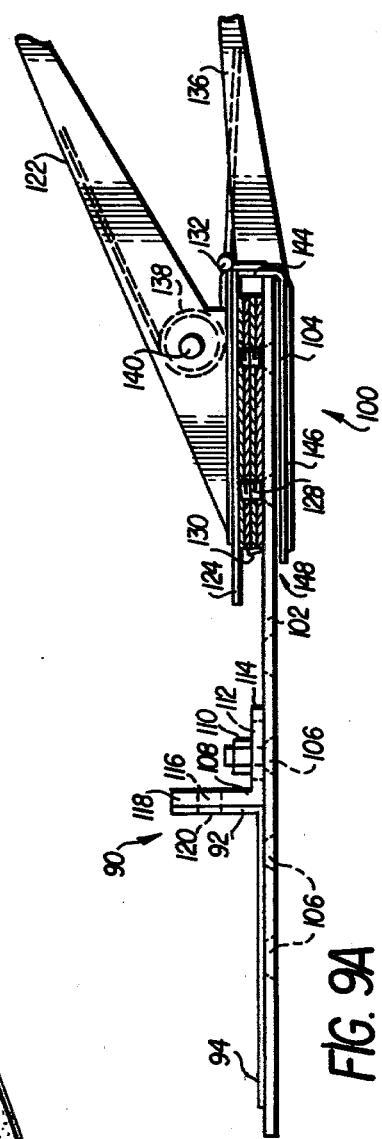

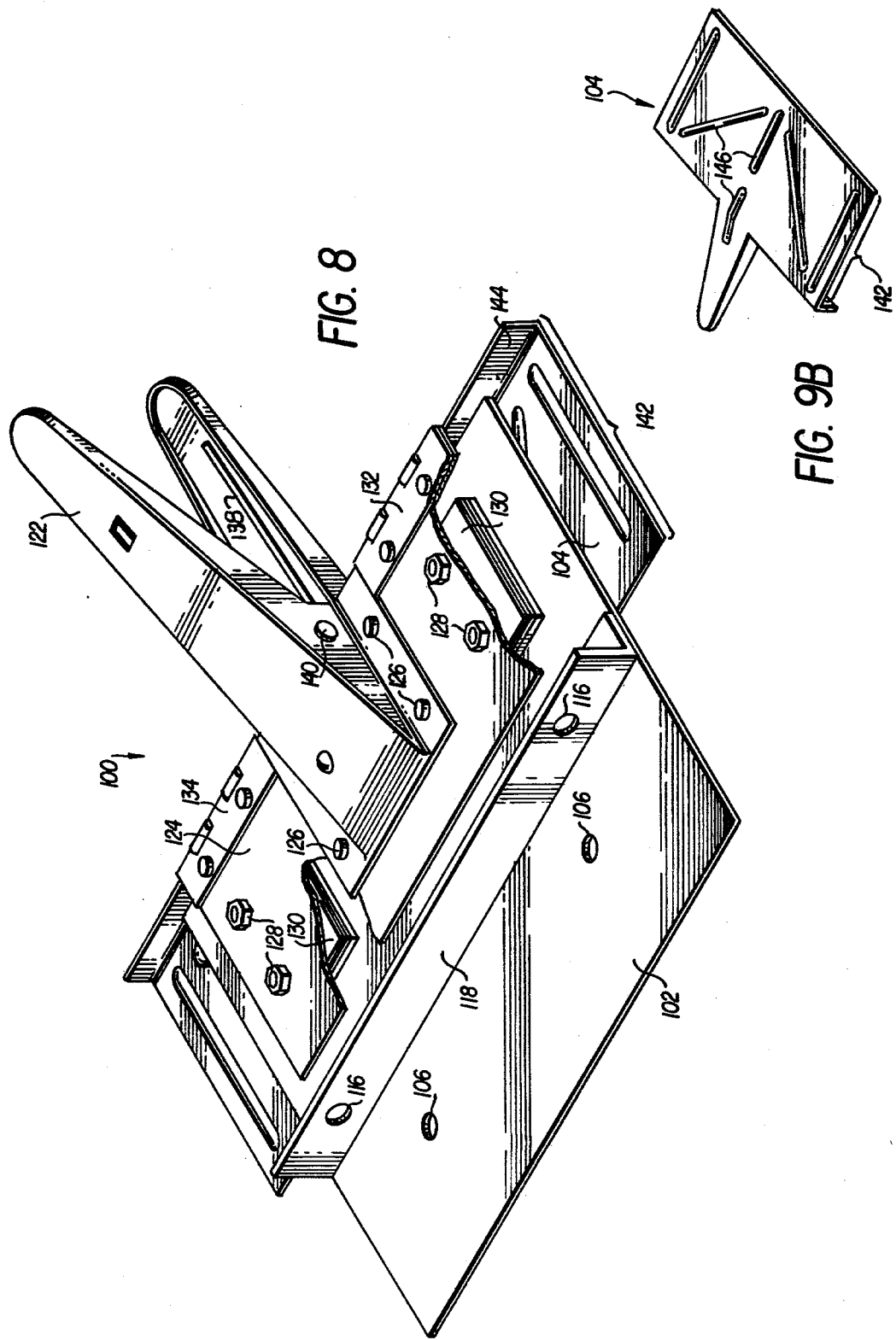

4,183,144

STRIP SHINGLE ALIGNMENT FIXTURES

CROSS-REFERENCE TO RELATED APPLICATIONS

This application is a continuation-in-part of my copending application Ser. No. 709,683 filed July 29, 1976 for "Strip Shingle Alignment Fixtures", now U.S. Pat. No. 4,056,889, issued Nov. 8, 1977, which in turn was a continuation-in-part of my then copending application Ser. No. 610,727 for "Shingle Alignment Fixture" filed on Sept. 5, 1975, and now abandoned.

BACKGROUND OF THE INVENTION

The process of applying roofing or siding shingles to the roof or outside walls of a building is an arduous, time consuming task. Roofers must work on steep surfaces, repeatedly crouching or sitting to position shingles; hammering or stapling the shingles and moving to the next location to be covered, all in frequently high temperatures. Conventionally, the roof or exterior wall to be covered is first provided with some sort of scaffolding or support structure on which the roofers stand to complete the shingle installation. Usually, chalk lines are applied to the roof or exterior wall to provide regular horizontal and vertical reference lines for use in attaching the shingles. As is understood in the art, such reference lines are considered necessary to ensure the laying of regular courses of shingles which provide a neat and uniform exterior appearance for the building. The process of providing the chalk lines is a time consuming one and the subsequent process of individually placing shingles in alignment with the chalk lines; manually holding the shingles in place; fastening the shingles; and then repeating these steps also is quite slow and tiresome.

The prior art discloses numerous devices which are intended to simplify the process of applying roofing or siding shingles. For example, U.S. Pat. No. 988,808 discloses a roof scaffold including a horizontal alignment bar which may be moved upwardly along the roof surface as the job progresses. Similarly, U.S. Pat. No. 3,842,934 shows a complex type of scaffolding for laying roofing materials on a sloping roof. Although these prior art systems do ease somewhat the task of laying parallel rows of shingles, it is still necessary for the roofer to manually adjust each shingle as it is laid to ensure that succeeding rows of shingles are staggered relative to one another in the usual manner. Also, cumbersome equipment must be moved from row to row. Another attempt at providing alignment guides for shingles is disclosed in U.S. Pat. No. 3,110,113 which includes an alignment guide having means attached thereto for orienting a row of shingles to be laid so that they are staggered relative to a previously laid row of shingles. However, the structure of this device is such that it is necessary for the roofer to very carefully insert a plurality of guide elements between the tabs of the shingles of a previously laid row in order to set up the device for laying a new row of shingles. Also, the device is adapted only for use with a single standard shingle.

Prior art devices also fail to account for the fact that even mass-produced shingles will vary in overall length, tab location, thickness and the like from lot to lot or manufacturer to manufacturer. Length and tab location variability of as little as one-fourth inch per shingle can result in a very noticeable, and undesirable, misalignment of shingles where such variations accumulate for long rows of shingles. Variations in shingle thickness can cause the clamps used in some prior art devices to fail to grip their shingles sufficiently or to over compress and damage thicker shingles. Where the grip is too loose, prior art devices fail to hold the required horizontal position, resulting in misalignment. Where the grip is too tight, the protective mineral coating on the shingle may be so damaged as to expose the underfelt to undesirable weathering, to reduce the fire resistance of the shingle or to cause actual leakage.

Thus, it is seen that although the prior art discloses numerous attempts to provide alignment devices which will simplify and speed up the shingling process, there remains a need for an inexpensive durable alignment guide which may be quickly and easily installed in its operating position on most commonly encountered roofs or exterior walls; will accept a plurality of standard roofing and siding strip shingles; will automatically stagger succeeding rows of shingles relative to the previously laid row; and will ensure that succeeding rows of shingles are substantially parallel.

OBJECTS OF THE INVENTION

An object of this invention is to provide a shingle alignment guide which may be used for aligning shingles of the asphalt composition or similar flexible type, and which is especially adapted for use in aligning shingles of the type having slotted or unslotted edges which usually define from one to four shingle tabs on each individual shingle.

Another object of the invention it to provide such an alignment guide which is of simple, light-weight, economical construction and which will automatically position a succeeding row of shingles in parallel and staggered relation to a previously laid row of shingles.

Another object of the invention is to provide a shingle alignment guide which is adapted for attachment to previously laid shingles while holding shingles to be laid thereby essentially eliminating the need for chalked guide lines and scaffolding attached to the roof or exterior wall, during shingle application, and also freeing the user's hands for nailing or stapling the shingles in the quickest possible manner.

A further object of the invention is to provide a shingle alignment guide which is simple to use and does not require extensive special training or the use of highly skilled labor in its application to a roof.

Yet another object of the invention is to provide a shingle alignment guide which includes means for clamping the guide to a previously laid row of shingles, the clamping means including large area, flat jaw members for distributing clamping force over a large shingle area, thereby minimizing chances for damage to previously laid shingles.

A still further object of the invention is to provide a shingle alignment guide which is adjustable in length through the use of two standard length sections, to accept a large number of standard shingles.

Still another object of the invention is to provide a shingle alignment guide which may be easily lifted, moved and installed by a roofer, generally without requiring the use of both hands.

The above objects of the invention are intended to be only exemplary; thus, other desirable objectives and advantages inherently achieved by the invention may be perceived by those skilled in the art. Nonetheless, the scope of the invention is to be limited only by the appended claims.

SUMMARY OF THE INVENTION

The above and other objects of the invention are achieved by the disclosed alignment fixture which includes in one embodiment an elongated alignment guide for simultaneously supporting the lower edges of a plurality of shingles which are to be laid. Spacers position the shingles on the guide. A clamping device is attached to the guide for positioning it in staggered, parallel relation to a previously laid row of shingles. The clamping means includes a pair of superposed clamping jaws, the upper one of which is attached to the alignment guide. The lower jaw is adapted to slide under and align with the lower edge of at least one shingle or shingle tab in the previously laid row of shingles. The jaws are joined by a manually openable means which compresses the jaws together to grip a shingle or shingle tab in the previously laid row.

In some embodiments, the alignment guide includes a plurality of interconnectable guide sections. Some of the guide sections are equal in length to two standard shingles and others of the sections are equal in length to a single shingle. Thus, alignment guides of any desired length may be assembled from these two types of interconnectable sections. The means for compressing the jaws into contact with a previously laid shingle may include a pair of levers pivoted to each other, one of the pair being attached to the uppermost jaw and the other of the pair being attached to the lowermost jaw. A resilient device such as a spring is provided to bias the levers so that the jaws are forced together. The levers may be manually pivoted against the biasing force of the spring to open the jaws prior to installation on a previously laid shingle.

Another preferred embodiment of the invention includes an elongated alignment guide having a plurality of adjustable spacers thereon which may be moved or removed to accommodate shingles of different sizes or with different numbers of tabs. A clamp is attached to the guide so that the device may be attached to a previously laid row of shingles. The guide is usually horizontally adjustable relative to the clamp. A stop is affixed to the guide to position it relative to the previously laid row of shingles so that the desired staggering of shingles is achieved. If desired, both the stop and the clamp may be moved horizontally relative to the guide to provide maximum flexibility.

To accommodate shingles having various lengths of exposure between successive rows, the invention provides means for moving the clamp toward and away from the guide as necessary for a desired exposure. The clamp according to the invention is provided with shims for adjusting it to accommodate shingles of varying thickness.

In certain embodiments, a stop is provided to be used in conjunction with a guide and clamp combination to position the guide relative to the previously laid row of shingles so that the desired staggering of shingles is achieved. The stop can be attachable to the guide and/or clamp and/or roof. Also, the spacers means on the guide in these embodiments are optional.

The shingle alignment fixture according to the invention facilitates especially the installation of asphalt composition strip shingles in accordance with the requirements set forth by the Asphalt Roofing Manufacturers Association. Shingles of single or multiple tab configuration may be installed using the invention. Although the invention is described herein with particular reference to "asphalt composition strip shingles", those skilled in the art will recognize that shingles of other compositions having similar characteristics may also be installed with my invention

BRIEF DESCRIPTION OF THE DRAWINGS

FIG. 7 shows a schematic; perspective view of a roof or exterior side on which three rows of strip shingles have previously been laid. An alignment guide according to another embodiment of the invention is shown clamped to one of the previously laid shingles. Three shingles to be laid are shown in positions to be laid on the alignment guide.

FIG. 8 shows a perspective view of a clamping device used in the embodiment of FIG. 7.

FIG. 9A shows a side view of the clamping device of FIG. 8. FIG. 9B shows a bottom view of the lower jaws of the clamping device of FIG. 8.

DETAILED DESCRIPTION OF THE PREFERRED EMBODIMENT

Figure 1:
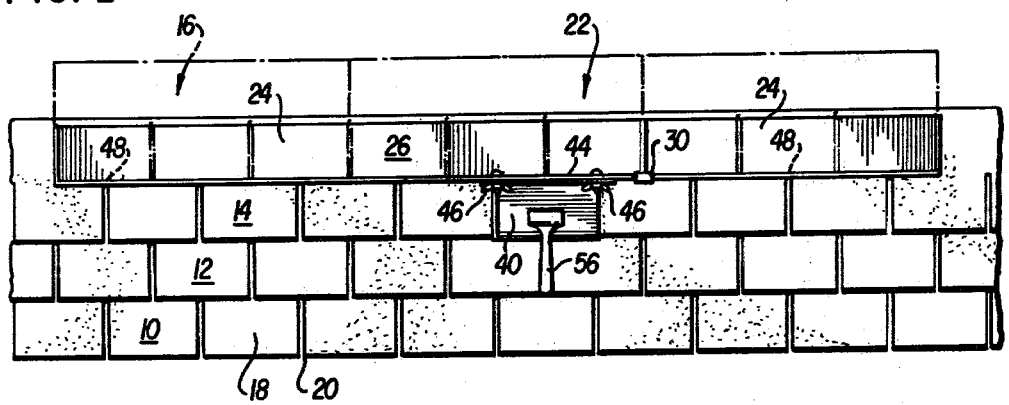
FIG. 1 shows a schematic view of a roof or exterior side on which three rows of shingles have previously been laid. An alignment guide according to one embodiment of the invention is shown clamped to a tab of one of the previously laid shingles.
Figure 2:
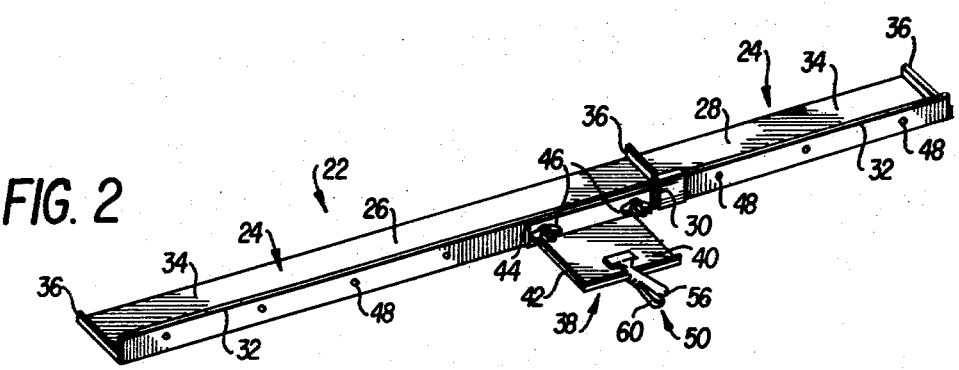
FIG. 2 shows a perspective view of a shingle alignment guide according to one embodiment of the invention.

There follows a detailed description of the invention, reference being had to the drawings in which like reference numerals identify like elements of structure in each of the several Figures.

In FIG. 1, three courses 10, 12 and 14 of previously laid strip shingles are indicated schematically, along with a phantom course 16 of shingles to be laid subsequently. In this illustration, standard, three tab strip shingles are shown which include three tabs 18, separated by slots 20. This familiar arrangement provides the appearance of individual shingles when the roof or siding has been completed. Those skilled in the art will recognize that conventional single tab shingles having two, four or more tabs may also be used without departing from the scope of the present invention.

Phantom course 16 is supported by an alignment fixture 22 which includes an elongated alignment guide 24. Alignment guide 24, which preferably is of extruded aluminum, includes a first section 26 sized to receive two standard shingles and a second section 28 sized to receive one standard shingle. The two sections are connected by a joint 30. By using sections 26 and 28 in various combinations, it is possible to assemble an alignment guide capable of receiving 2, 3, 4 or more standard shingles.

Each of sections 26 and 28 comprises an upstanding shingle support flange 32. Extending at essentially a right angle from the lower end of flange 32 is a base flange 34. At either end of sections 26 and 28 are provided end stops 36 against which the standard shingles are butted to align them laterally for attachment to the roof or wall surface.

Means 38 are provided for clamping alignment guide 24 to one of tabs 18 of previously laid course of shingles 14. Clamping means 38 comprises upper 40 and lower 42 essentially flat, rectangular clamping jaws. In the illustrated embodiment, jaws 40 and 42 are of a width approximately equal to the width of tabs 18, so that a large bearing area is provided when clamping means 38 is actuated. Although other widths may be used for jaws 40 and 42, it is important that the contact surfaces of the jaws with the tabs 18 be essentially flat and of a rather large area in order to distribute the clamping force over a large portion of the area of tabs 18. If desired, the contact surfaces of jaws 40 and 42 may be roughened slightly to improve the frictional contact. The use of narrow clamping jaws or thumb screw clamps of the variety known in the prior art is undesirable due to the high local loading placed on tabs 18 which often results in deformation or tearing of the previously laid course of shingles and attendant delay and expense to repair the damage.

Attached to one edge of jaw 40 is a bracket 44 which includes a pair of spaced holes. Shingle support flange 32 includes a plurality of correspondingly spaced holes which are sized to receive bolt and wing nut combinations 46 for attaching clamping means 38 to alignment guide 24. The holes 48 in alignment guide 24 are spaced so that when the clamping means 38 is attached to alignment guide 24 in the illustrated embodiment, the clamping jaws 40 and 42 will be located so that the tabs in the previously laid row of shingles will be centered on slots 20 in the row of shingles to be laid, when clamping means 38 is attached to a tab in the previously laid row. Thus, when jaws 40 and 42 are approximately the width of tabs 18 as illustrated, holes 48 are spaced at distances approximately equal to the tab width or the distance between the slots on the standard shingles, all along the length of alignment guide 24. Due to the placement of holes 48, clamping means 38 may be attached at approximately the center of alignment guide 24 regardless of the number of sections 26 and 28 which are connected to form alignment guide 24.

Figure 3:
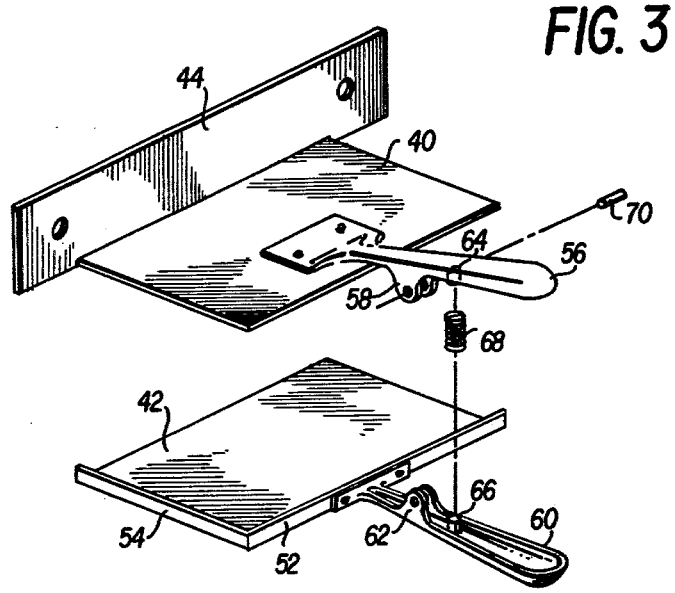
FIG. 3 shows an exploded view of one form of the clamping means used with the invention.

As shown in FIG. 3, jaw 42 includes an upstanding lip 52 along its lower edge for engaging the bottom edge of tabs 18 and an upstanding lip 54 along one side edge for engaging a side edge of tabs 18. Lip 52 is parallel to support flange 32; whereas, lip 54 is perpendicular thereto. In use, the operator slides jaw 42 beneath one of tabs 18 so that upstanding lip 52 contacts the bottom edge of the tab and upstanding lip 54 contacts a side edge of the tab within one of slots 20. In some instances, it may be desirable to provide another upstanding lip 54 on the opposite side of jaw 42 or to omit upstanding lip 54 altogether; however, the illustrated geometry is preferred, to prevent rotational movement of the fixture when it is clamped to a tab. For example, it may be desirable to delete upstanding lip 54 when the device is being used with asphalt type shingles which do not include slots 20 into which the lip 54 could extend during use.

Clamping means 38 is actuated by a spring-biased means 50 which compresses jaws 40 and 42 together to grip one of tabs 18. Compressing means 50 includes a first lever 56 attached to jaw 40. Lever 56 includes a depending pivot 58. A second lever 60 is attached to jaw 42 and includes a pivot 62 adapted to mate with pivot 58 of lever 56. The inside surfaces of levers 56 and 60 include oppositely extending, axially aligned bosses 64 and 66 which serve to capture therebetween a biasing spring 68 when levers 56 and 60 are pivotally assembled by means such as a hinge pin 70. The arrangement of levers 56 and 60 permits manual opening of compressing means 50 with a single hand, which greatly facilitates use of the invention.

Figure 4:
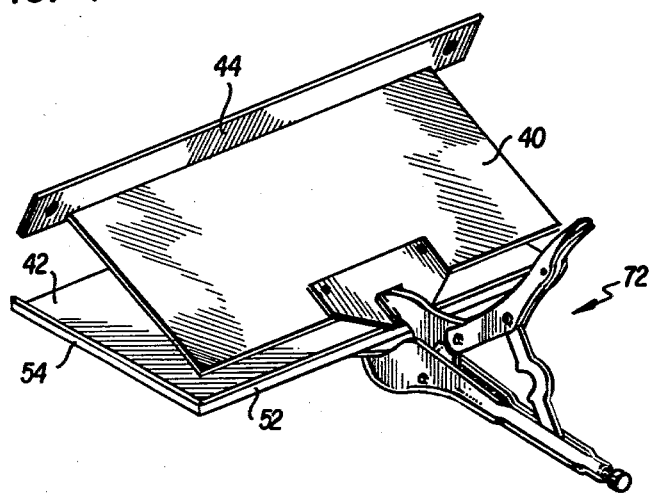
FIG. 4 shows a perspective view of an alternative form of clamping means used in the invention.

FIG. 4 illustrates an alternative form of compressing means which may be used to interconnect jaws 40 and 42. In this embodiment, a pair of conventional locking pliers 72 is attached to jaws 40 and 42 as illustrated. This embodiment provides satisfactory compression of jaw members 40 and 42 into contact with tabs 18; however, the locking pliers are somewhat more difficult to release then the spring-biased means 50 shown in FIG. 3, as will be understood by those familiar with this type of locking pliers.

Figure 5:
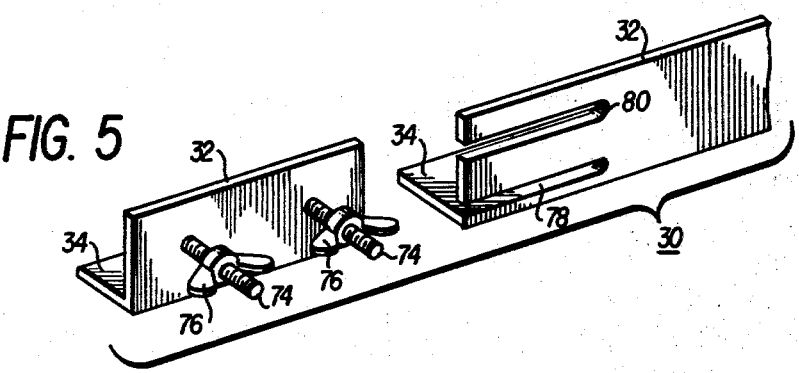
FIGS. 5 and 6 show alternative forms for the section joint used to interconnect alignment guide sections.
Figure 6:
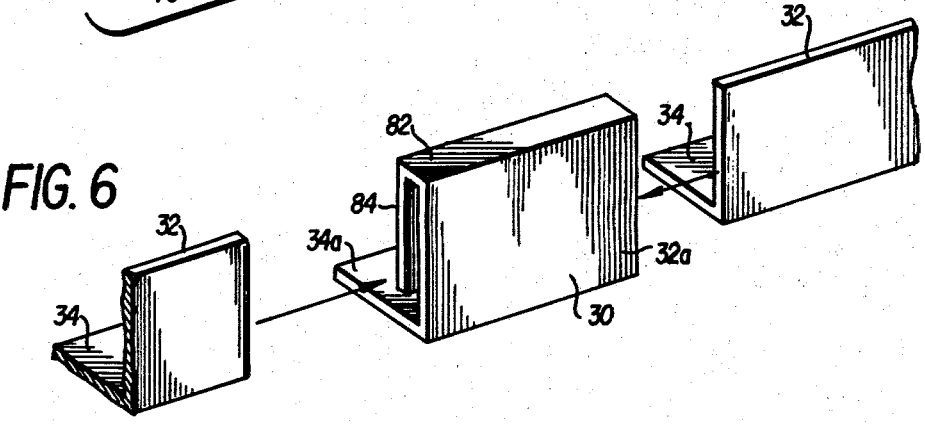

FIGS. 5 and 6 show alternative forms of joint 30 for interconnecting sections 26 and 28 of alignment guide 24. In FIG. 5, one end either section 26 or 28 is provided with a pair of bolts 74 extending through holes in shingle support flange 32 which threadingly receive wing nuts 76. The mating end of the adjacent section 26 or 28 includes an elongated slot 78 at the base of shingle support flange 32 and a slot 80 located midway in support flange 32. To assemble the sections, slot 78 receives flange 34 of the adjacent section and slot 80 receives bolts 74. Wing nuts 76 are then hand tightened to secure the sections together.

In FIG. 6, an alternative joint form is shown which does not require the use of bolts and wing nuts. Joint 30 comprises an upstanding flange 32a and a flange 34a extending at right angles thereto. At the upper end of flange 32a, a short flange 82 extends parallel to flange 34a. Depending from the edge of flange 82 and extending parallel to flange 32a is locking flange 84. To assemble the sections, flanges 32 of sections 26 and 28 are inserted into the space between flange 84 and flange 32a to provide a secure joint.

In use, alignment guide 24 is assembled from one or more of sections 26 and 28 to achieve the necessary length required for the particular roofing or siding application. Clamping means 38 is then attached at approximately the midpoint of alignment guide 24 using the appropriate pair of holes 48. Due to the location of holes 48 as previously discussed, clamping means 38 will always be positioned so that the shingles to be laid will be staggered relative to the previously laid row of shingles when clamping means 38 is attached to one of tabs 18 in the previously laid row. Of course, to start shingling, at least one row of shingles must be previously laid by known methods, after which the present invention may be used to great advantage. When the alignment guide has been assembled, the operator slides jaw 42 under one of tabs 18 in the previously laid row of shingles and butts lip 52 against the bottom edge of tab 18. Lip 54 slides into one of slots 20 between the tabs 18 and is moved into alignment with the side edge of tab 18. Usually, this is accomplished with one hand, though very long guides may require the use of both hands. Clamping means 38 is then released by the operator so that jaws 40 and 42 are compressed into frictional contact with tab 18 to secure the alignment fixture in position. Standard shingles are then placed on alignment guide 22 as indicated in phantom in FIG. 1 and are retained in the proper staggered position be end stops 36. The operator then attaches the shingles to the underlying surface using conventional attachment means such as a staple gun. When the shingles supported on alignment guide 22 have all been attached, the clamping means 38 is released by squeezing levers 56 and 60 with one hand so that the device may be withdrawn from contact with tab 18 of the previously laid row of shingles. Alignment fixture 22 is then shifted upward to the row of shingles just laid and attached to one of tabs 18 of that row. The above process then is repeated until the surface has been covered. In actual use, the applicant has found that the time required to apply a given number of square yards of shingles can be reduced by from one-third to one-half, while requiring fewer men to complete the job. Thus, the invention greatly increases the efficiency of the roofing process.

While the embodiment of FIGS. 1 to 6 has proven to be very useful in applying strip shingles, some drawbacks have been noted. Particularly, the previously described embodiment may be adjusted only with difficulty to accommodate size variations commonly encountered within a lot or from lot to lot of shingles. Since end stops 36 are fixedly attached to guide sections 26 and 28, the sections may be too short to accept overly long shingles or too long to properly position unduly short shingles. Thus, some adjustability is desirable. The embodiment of FIGS. 7 to 11 is especially suited to provide greater flexibility in use.

Figure 10:
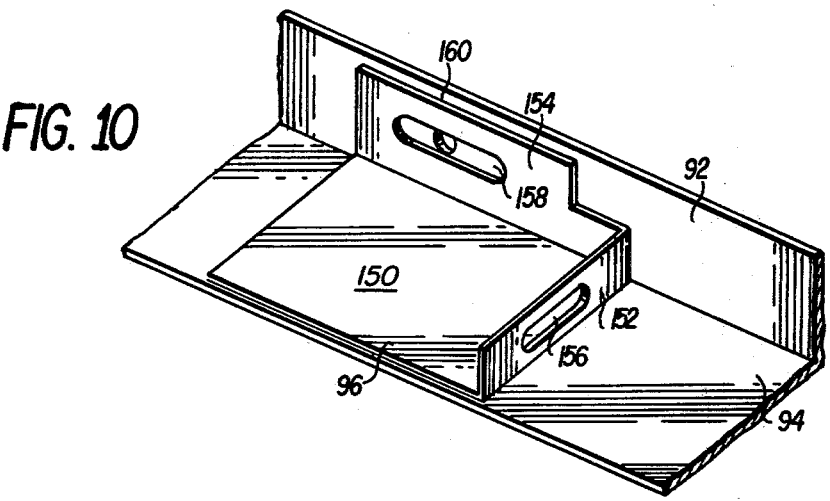
FIG. 10 shows a fragmentary perspective view of the alignment guide of FIG. 7, indicating the geometry of the adjustable spacers used to position shingles on the guide.
Figure 11:
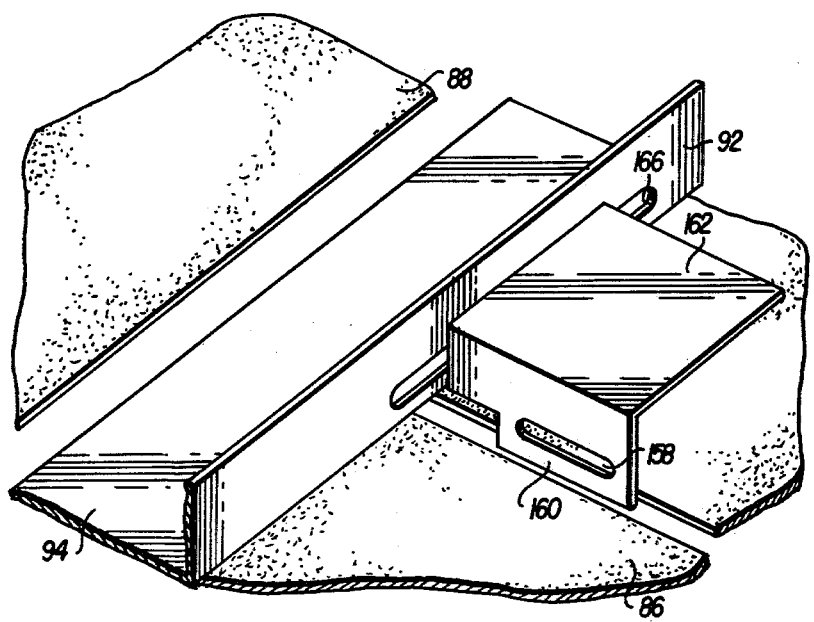
FIG. 11 shows a fragmentary perspective view of the alignment guide of FIG. 7, indicating the horizontal stop used to position the guide to properly stagger shingles row to row.

In FIG. 7, three courses 83, 85 and 86 of previously laid strip shingles are shown, with a fourth course 88 in position to be laid subsequently. Course 88 is to be supported by an elongated, horizontal, adjustable alignment fixture or guide 90. Alignment guide 90 is preferably made from extruded aluminum and is somewhat longer than nine feet, in order to accommodate three standard length strip shingles with some room left for adjustment. Guide 90 comprises an upstanding shingle support flange 92. Extending at essentially a right angle from the lower edge of flange 92 is a base flange 94. Along the length of guide 90, a plurality of selectively, horizontally adjustable spacers 96 are provided which serve to position the shingles of course 88 at the desired predetermined intervals along guide 90. Spacers 96, which are described in greater detail with respect to FIGS. 10 and 11, are attached to support flange 92 using bolt wing nut combinations 98, preferably having lock washers.

Means 100 are provided for clamping guide 90 to one or more of the shingles in the previously laid course 86, while holding guide 90 parallel to course 86. As shown in greater detail in FIGS. 8, 9A and 9B, clamping means 100 comprises an upper jaw or shingle plate 102 and a lower jaw 104. Shingle plate 102, which is preferably of thin steel for rigidity and light weight, includes two parallel rows of apertures 106 spaced at approximately one inch intervals along each row. An angle iron 108 rests on the upper surface of shingle plate 102 and is attached to it by a pair of fasteners 110, such as flat head screws and associated nuts. Fasteners 110 pass through elongated apertures 112 in bottom leg 114 of angle iron 108, so that angle iron 108 can be moved forward and back on shingle plate 102 without completely undoing fasteners 110. By moving angle iron 108 on shingle plate 102, the amount of shingle exposure may be varied, usually from 4 to 7 inches. Angle iron 110 includes spaced apertures 116 in the upwardly extending leg 118 thereof. Using conventional screws and nuts or wing nuts, angle iron 110 joins clamping means 100 to guide 90 via pairs of elongated slots 120 located in guide 90 near its center and at either end. In most cases, a single clamping means 100 is used at the illustrated central location; however, on very steep or mansard type roofs, a clamp at either end of guide 90 is desirable to provide additional holding force.

Clamping means 100 is actuated by a pair of spring biased, pivoted levers attached to shingle plate 102 and lower jaw 104. Upper lever 122 is rigidly attached to a rectangular plate 124 via means such as rivets 126. Plate 124, in turn, is rigidly attached to shingle plate 102 by a plurality of fasteners 128, such as flat head screws and associated nuts and washers. A plurality of shims 130 are captured between plate 124 and shingle plate 102 by fasteners 128, for a purpose to be explained hereinafter.

Along the back edge of plate 124, on either side of upper lever 122, one side of a pair of hinges 132 and 134 is attached. The other sides of hinges 132 and 134 are attached to lower jaw 104, so that shingle plate 102 and lower jaw 104 may pivot freely thereabout. Lower lever 136 extends from lower jaw 104 just below upper lever 102 to provide a convenient handle or squeeze-grip for the user. A coil spring 138 (shown in phantom in FIG. 9A) biases clamping means 100 to close jaws 102 and 104 with sufficient force to hold guide 90 in position on a previously laid row of shingles. Pin 140 retains spring 138.

Lower jaw 104 comprises a flat section 142 which extends in a direction essentially parallel to shingle plate 102 when clamping means 100 is closed, as shown in FIG. 9A. An upwardly extending lip 144 along the back edge of jaw 104 provides both an attachment point for hinges 132 and 134 and a stop against which the lower edge of a previously laid shingle is butted when the guide is in use. Lip 144 is parallel to angle iron 108. To ensure that lower jaw 104 is sufficiently rigid to transmit clamping force relatively evenly to shingle plate 102, reinforcing ribs 146 are embossed into jaw 104 to protrude below its lower surface, as seen best in FIGS. 9A and 9B.

The function of shims 130 is best understood with reference to FIGS. 8 and 9A. To provide optimum distribution of clamping force and to minimize shingle damage due to undesirable local or spot loading of the shingles during clamping, it is preferred that flat jaws 102 and 104 be essentially parallel when the shingle is clamped. Thus, full jaw surface contact is established rather than local or line contact which could occur with non-parallel jaws. Since lip 144 extends substantially above the plane of lower jaw 104, shingle plate 102 ordinarily must be spaced below rectangular plate 124 to some extent so that the shingle plate will be essentially parallel with jaw 104 when clamping means 100 has closed. Shims 130 provide the necessary spacing. For very thick shingles up to about the height of lip 144, no shims would be required; however, several shims would be necessary for use on thin shingles, as illustrated in FIG. 9A where only a relatively small gap 148 remains between the jaws when clamping means 100 is closed.

FIG. 10 shows the preferred structure of one of adjustable spacers 96. Spacers 96 are made in both right and left hand versions; however, those skilled in the art will appreciate from the following that either right or left hand spacers may be used with virtually equal advantage. A left hand spacer is shown in FIG. 10. Each spacer comprises a flat rectangular base portion 150 having two upstanding side walls or lips 152 and 154. Wall 152 extends across the width of base flange 94 to provide a stop or spacer against which shingles to be laid will rest with the desired horizontal spacing or interval. An elongated slot 156 in wall 152 facilitates the use of spacer 96 as a horizontal stop for guide 90 in a manner to be discussed with regard to FIG. 11. Wall 154 extends at right angles to wall 152 and includes an elongated slot 158 through which bolt and wing nut combinations 98 extend (not shown). By moving spacer 96 back and forth along slot 158, the alignment fixture may be adjusted as necessary to accommodate variations in shingle size. Two spacers per shingle are preferred; however, one for each shingle edge and slot may be used if desired.

The upper surface of wall 154 includes a raised portion 160 which further facilitates use of each spacer 96 as a horizontal stop for guide 90. Assuming in FIG. 7 that the guide has been adjusted to accept the shingles of course 88 and that clamping means 100 has been attached as illustrated to guide 90, provision must be made to stagger course 88 relative to course 86 in the familiar manner. This could be done visually; however, to do so would invite cumulative errors which would produce an unattractive, misaligned roof. According to this embodiment of the invention, staggering is automatically achieved by the inclusion of a horizontal stop 162, illustrated in FIGS. 7 and 11. Actually, the illustrated stop 162 is an inverted, right hand version of one of spacers 96. A pair of elongated slots 164 and 166 are provided at either end of guide 90 for horizontally, adjustably mounting stops 162 using a fastener such as a nut and bolt inserted through slots 156 and 166. Raised portion 160 is sized so that it will extend below base flange 94 into the slots between the tabs of the shingles in course 86. By properly positioning stop 162 in slot 166 and then butting raised portion 160 against the edge of the last shingle of course 86, the shingles of new course 88 will automatically be staggered relative to course 86.

In use, the entire fixture is assembled as shown in FIG. 7 with spacers 96, clamping means 100 and stop 162 loosely fastened to guide 90. Clamping means 100 has been provided with the appropriate number of shims 130 for the shingles to be laid. Fasteners 110 have been secured through the appropriate ones of apertures 106 to give the desired exposure of shingles. Clamping means 100 is then clamped to a shingle in the previously laid row at about the middle of a group of three strip shingles. Three strip shingles are laid on guide 90 and spacers 96 are moved as necessary to provide the proper spacing between shingles. Wing nuts 98 are tightened. Guide 90 is then moved relative to clamping means 100 until the strip shingles are properly staggered. The carriage bolts (not shown) between guide 90 and clamping means 100 are tightened somewhat, still allowing guide 90 to slide relative to clamping means 100. End stop 162 is moved through slott 166 or 164 until raised portion 160 drops down next to the edge of the last shingle in course 86. With raised portion 160 butted up against the edge of the last shingle, end stop 162 is tightened in its place. The first three shingles are then attached to the roof or side wall and the alignment fixture is unclamped, ready for the next group of three shingles.

The next group is quickly attached by simply slipping lower jaw 104 of open clamping means 100 under one of the previously laid shingles, closing clamping means 100, and sliding end stop 162 into place against the edge of the last shingle of the previous row by moving guide 90 relative to clamping means 100. The next group of shingles is then placed and fastened, and the process is repeated. Since the roofer need not hold and align each shingle, roofing proceeds at about twice the speed of present day roofing methods.

If a shingle comes along which is larger or smaller than the settings on the alignment fixture of this invention, the roofer knows immediately since the shingle won't fit the device properly. An occasional odd-sized shingle may be set aside for later use. If a new bundle of shingles of different size is encountered, the device may be quickly reset as previously discussed so that work proceeds without incurring undesirable misalignments in the shingles.

Figure 12:
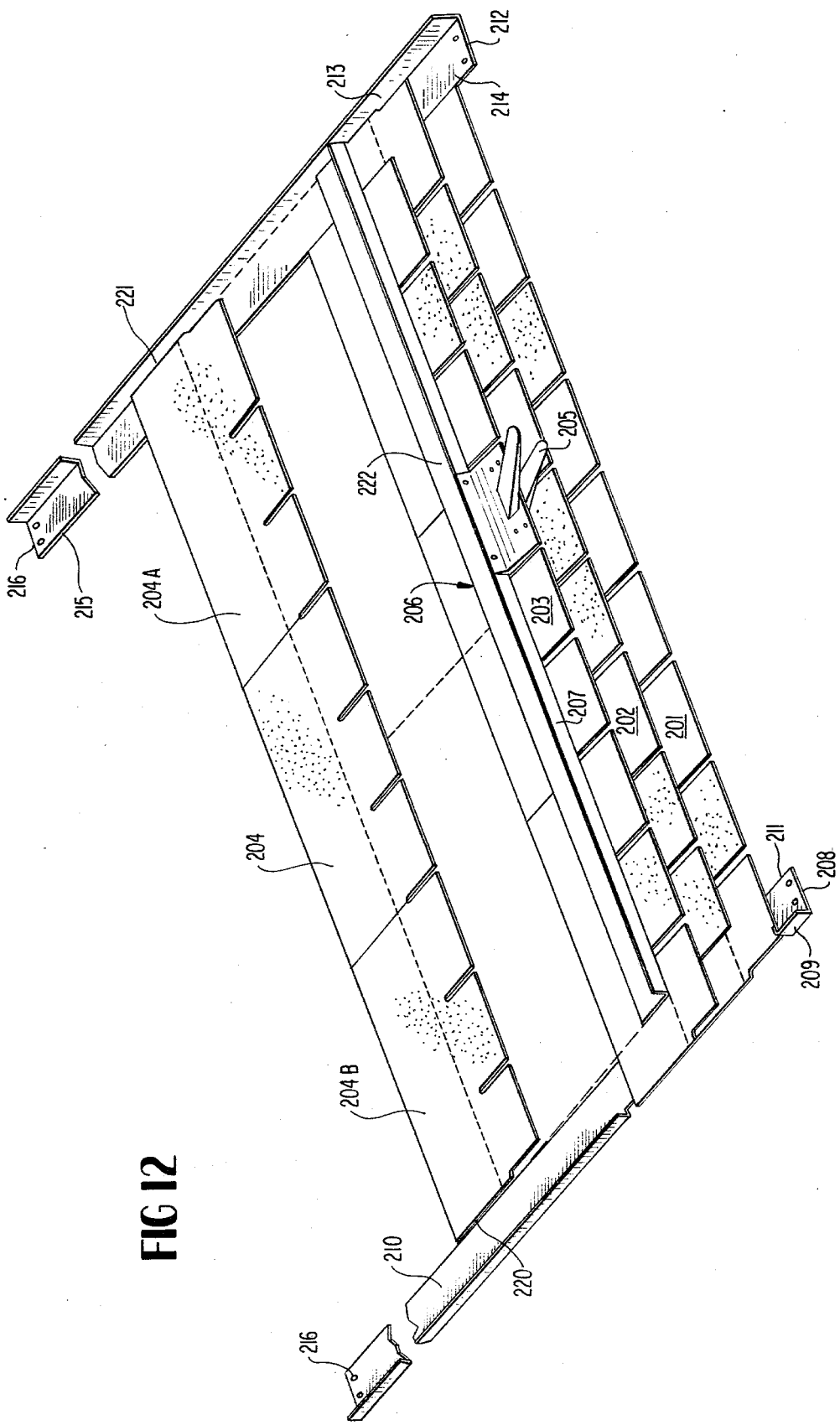
FIG. 12 shows a schematic view of a roof or exterior side on which three rows of shingles have previously been laid. An alignment guide and stop means according to one embodiment of the invention is shown clamped to one of the previously laid shingles.

FIG. 12 illustrates still another embodiment for an alignment fixture which is particularly suitable for accommodating size variations which may be encountered within a lot or from lot to lot of shingles. In FIG. 12, three courses 201, 202, and 203 of previously laid strip shingles are shown with a fourth course 204 in position to be laid subsequently. Course 204 is to be supported by an elongated, horizontal, adjustable alignment fixture or guide 206. Alignment guide 206 is preferably made from extruded aluminum and is somewhat longer than nine feet, in order to accommodate three standard length strip shingles with some room left for adjustment. Guide 206 comprises an upstanding shingle support flange 207. Extending at essentially a right angle from the lower edge of flange 207 is a base flange 222.

Means 205 are provided for clamping guide 206 to one or more of the shingles in the previously laid course 203, while holding guide 206 parallel to course 203.

Suitable clamping means are shown in greater detail in FIGS. 3, 4, 8, 9A, and 9B, and are discussed hereinabove. The preferred clamping means being that shown in FIGS. 8, 9A, and 9B.

The alignment fixture also includes a pair of horizontal stops 208 and 212 adopted to be secured to the roof such as by means 216 and to be used in conjunction with guide 206 so that successive rows of strip shingles are staggered relative to each other. Stops 208 and 212 each comprise an upstanding support flange 209 and 213, respectively. Extending at essentially a right angle from the lower edge of each flange 209 and 213 is a base flange 210 and 214, respectively. The width of each base blange corresponds to the amount one course of shingles is to overlap the course directly below or above it. A convenient distance used is about 6". The stops can be made any convenient length and when desired can be as long as the roof. When less than the length of the roof, the stops will have to be moved upwards when the shingling has reached the top thereof.

Although in this embodiment it is not necessary to employ spacers for positioning the shingles in the guide, such can be used when desired. The preferred type being those shown in FIGS. 7 and 10.

According to this embodiment of the invention, staggering is achieved by the inclusion of the horizontal stops 209 and 214. By the positioning stops 209 and 214 parallel to the roof edge. The stops are spaced from each other by approximately the length of the number of shingles which the guide 206 is designed to accommodate plus the width of one of the stops (i.e., the amount by which the courses are to be staggered). By butting the right edge 221 of shingle 204A against flange 213 butting the left edge 220 of shingle 204B against edge 211 of stop 208, and placing the middle shingle between 204A and 204B, the course 204 will be staggered relative to course 203. A next course will be staggered relative to course 204 by butting the right edge of the rightmost shingle against edge 215 of stop 212, butting the left edge of the leftmost shingle against flange 209 of stop 208 and positioning the middle shingle between these two outside shingles.

In use, the horizontal stops 209 and 212 are positioned parallel to a roof edge and secured to the roof undermaterial. The stops are positioned in the embodiment shown about three shingles length and 6" apart. Clamping means 205 is clamped to a shingle in the previously laid row at about the middle of a group of three strip shingles and the right edge of the guide is positioned so that it butts against flange 213 of stop 212. The guide 206 is positioned by either moving the entire clamp and guide assembly together or by adjusting the guide relative to the clamp depending upon the type of clamp arrangement employing (e.g., whether the clamp is that of FIGS. 3 and 4 or 8). Also, it is not necessary that guide 206 butt against the flange also so long as it is close enough thereto so that the shingles will be properly supported and aligned. The rightmost shingle is laid in the guide and positioned so that its rightmost edge butts against flange 213 and the leftmost shingle is laid on the guide and positioned so that its left edge butts against the edge 211 of stop 208. Next, the middle shingle is laid on the guide 206 between the leftmost and rightmost shingles. If the total length of the three strip shingles is somewhat longer than the distance between flange 213 and edge 211, the middle shingle can overlap the other two shingles which will not detract from the overall appearance since the outer edges of the courses will be aligned. The shingles are then attached to the roof and the alignment fixture is unclamped ready for the next course of three shingles.

The next group is quickly attached by simply slipping clamping means 205 under one of the previously laid shingles and positioning the left edge of the guide so that it butts against flange 209 of stop 208 or close thereto. The leftmost shingle is laid on the guide and positioned so that its leftmost edge butts against flange 209 and the rightmost edge butts against edge 215. Next, the middle shingle is laid on the guide 206 between the leftmost and rightmost shingles. The shingles are then attached to the roof and the alignment fixture is unclamped ready for the next course of shingles. After the shingling is completed, the stops are detached from the roof and slid out from under the shingle edges.

Having described my invention in sufficient detail to enable those skilled in the art to make and use it, I claim:

1. An alignment fixture for use with strip shingles for roofing and siding, comprising:
   an elongated horizontal alignment guide for simultaneously supporting the lower edges of a plurality of strip shingles to be laid;
   clamping means for attaching said guide to a previously laid row of strip shingles in parallel relation thereto;
   means joining said clamping means and said guide for permitting selectively adjustable horizontal movement of said guide relative to said clamping means while said clamping means is attached to said previously laid row, whereby said strip shingle to be laid may be properly positioned relative to said previously laid row without requiring removal of said clamping means from said previously laid row; and
   horizontal stop means for positioning said guide and said strip shingles to be laid in a predetermined, staggered relation to said previously laid row of strip shingles; wherein said horizontal stop means comprises a pair of members each having an upstanding flange for having butt there against a vertical edge of one of said strip shingles to be laid and a base flange at essentially a right angle from the lower edge of the upstanding flange having a width wherein the width of the base flange is equal to the amount by which the shingles are to be staggered and said base flange further having a vertical edge opposite the lower edge of said upstanding flange for having butt there against an edge of another of said strip shingles to be laid.

2. The fixture of claim 1 wherein said horizontal stop means includes means for attaching it to said roofing.

3. A fixture according to claim 1 wherein said clamping means comprises first and second superposed clamping jaws, the uppermost of said jaws being attached to said guide by said means joining said clamping means and said guide; and the lowermost of said jaws being adapted to slide under and align with the lower edge of at least one shingle in said previously laid row of shingles, and manually operable means connected between said jaws for compressing said jaws together to grip said at least one shingle in said previously laid row.

4. An improved alignment fixture for use with asphalt composition strip shingles for roofing and siding, comprising:
   an elongated horizontal alignment guide for simultaneously supporting the lower edges of a plurality of strip shingles to be laid;
   horizontal stop means for positioning said guide and said strip shingles to be laid in a predetermined, staggered relation to said previously laid row of strip shingles; said horizontal stop means comprises a pair of members each having an upstanding flange for having butt there against a vertical edge of one of said strip shingles to be laid and a base flange at essentially a right angle from the lower edge of the upstanding flange having a width wherein the width of the base flange is equal to the amount by which the shingles are to be staggered and said base flange further having a vertical edge opposite the lower edge of said upstanding flange for having butt there against a vertical edge of another of said strip shingles to be laid; and
   clamping means for attaching said guide to a previously laid row of strip shingles in parallel relation thereto, said clamping means comprising first and second superposed clamping jaws, the uppermost of said jaws being attached to said guide and the lowermost of said jaws being adapted to slide under and align with the lower edge of at least one shingle in said previously laid row of shingles, and manually operable means connected between said jaws for compressing said jaws together to grip said at least one shingle in said previously laid row, said jaws being normally resiliently biased to a closed position for compressing said at least one shingle.

5. The fixture of claim 4 wherein said horizontal stop means includes means for attaching it to said roofing.

* * * * *